United States Patent
Aihara et al.

(10) Patent No.: US 10,340,506 B2
(45) Date of Patent: **\*Jul. 2, 2019**

(54) POSITIVE ELECTRODE FOR LITHIUM ION SECONDARY BATTERY AND LITHIUM ION SECONDARY BATTERY INCLUDING THE SAME

(71) Applicant: Samsung Electronics Co., Ltd., Suwon-si, Gyeonggi-do (KR)

(72) Inventors: Yuichi Aihara, Yokohama (JP); Heidy Hodex Visbalmendoza, Nara (JP); Seitaro Ito, Yokohama (JP)

(73) Assignee: SAMSUNG ELECTRONICS CO., LTD., Gyeonggi-Do (KR)

( \* ) Notice: Subject to any disclaimer, the term of this patent is extended or adjusted under 35 U.S.C. 154(b) by 645 days.

This patent is subject to a terminal disclaimer.

(21) Appl. No.: 14/951,624

(22) Filed: Nov. 25, 2015

(65) Prior Publication Data
US 2016/0156021 A1 Jun. 2, 2016

(30) Foreign Application Priority Data

Nov. 28, 2014 (JP) .................................. 2014-241208
Jun. 15, 2015 (KR) ........................ 10-2015-0084348

(51) Int. Cl.
| | |
|---|---|
| *H01M 4/131* | (2010.01) |
| *H01M 4/485* | (2010.01) |
| *H01M 4/62* | (2006.01) |
| *H01M 10/0525* | (2010.01) |
| *H01M 10/0562* | (2010.01) |
| *H01M 4/36* | (2006.01) |
| *H01M 4/505* | (2010.01) |

(52) U.S. Cl.
CPC ............ *H01M 4/131* (2013.01); *H01M 4/366* (2013.01); *H01M 4/485* (2013.01); *H01M 4/505* (2013.01); *H01M 4/625* (2013.01); *H01M 10/0525* (2013.01); *H01M 10/0562* (2013.01)

(58) Field of Classification Search
CPC ...... H01M 4/131; H01M 4/525; H01M 4/505; H01M 4/625; H01M 4/366; H01M 10/0525; H01M 10/0562
See application file for complete search history.

(56) References Cited

U.S. PATENT DOCUMENTS

| | | | |
|---|---|---|---|
| 8,993,167 B2\* | 3/2015 | Chang ................... | H01M 4/366 429/231.1 |
| 9,190,663 B2 | 11/2015 | Miki | |
| 9,225,019 B2 | 12/2015 | Chang et al. | |

(Continued)

FOREIGN PATENT DOCUMENTS

| | | |
|---|---|---|
| EP | 2395581 A1 | 12/2011 |
| JP | 2010-040439 A | 2/2010 |

(Continued)

*Primary Examiner* — Laura Weiner
(74) *Attorney, Agent, or Firm* — Cantor Colburn LLP

(57) ABSTRACT

A positive electrode for a lithium ion secondary battery, the positive electrode including a positive electrode particle including a positive active material particle, wherein the positive electrode particle comprises a first coating layer on a surface of the positive active material particle wherein the first coating layer includes a carbonaceous material, and a second coating layer on the first coating layer, wherein the second coating layer includes a lithium-containing compound, and a sulfide solid electrolyte contacting the positive electrode particle.

16 Claims, 3 Drawing Sheets

(56) References Cited

U.S. PATENT DOCUMENTS

| | | |
|---|---|---|
| 2009/0081554 A1 | 3/2009 | Takada et al. |
| 2011/0195315 A1 | 8/2011 | Tsuchida et al. |
| 2012/0251871 A1 | 10/2012 | Suzuki et al. |
| 2012/0298846 A1 | 11/2012 | Nomura et al. |
| 2013/0040193 A1 | 2/2013 | Tsuchida et al. |
| 2014/0093786 A1 | 4/2014 | Ito et al. |
| 2015/0118574 A1 | 4/2015 | Visbal et al. |

FOREIGN PATENT DOCUMENTS

| | | | |
|---|---|---|---|
| JP | 2010-146936 A | | 7/2010 |
| JP | 2011-044368 A | | 3/2011 |
| JP | 2011-165467 A | | 8/2011 |
| JP | 2011-187370 A | | 9/2011 |
| JP | 4982866 B2 | | 5/2012 |
| JP | 2012-514834 A | | 6/2012 |
| JP | 2012-209106 A | | 10/2012 |
| JP | 2013-037950 | * | 2/2013 |
| JP | 2013-037950 A | | 2/2013 |
| JP | 2013-089321 A | | 5/2013 |
| JP | 2013-134825 A | | 7/2013 |
| JP | 5455766 B2 | | 1/2014 |
| JP | 2014-049309 A | | 3/2014 |
| JP | 2015-088383 A | | 5/2015 |
| KR | 1020120125286 A | | 11/2012 |
| KR | 1020140010875 A | | 1/2014 |
| KR | 1020140076520 A | | 6/2014 |
| WO | WO 2013022034 | * | 2/2013 |
| WO | 2013/108589 A1 | | 7/2013 |

\* cited by examiner

POSITIVE ELECTRODE FOR LITHIUM ION SECONDARY BATTERY AND LITHIUM ION SECONDARY BATTERY INCLUDING THE SAME

CROSS-REFERENCE TO RELATED APPLICATION

This application claims priority to and the benefit of Japanese Patent Application No. 2014-241208, filed on Nov. 28, 2014, in the Japanese Patent Office, and Korean Patent Application No. 10-2015-0084348, filed on Jun. 15, 2015, in the Korean Intellectual Property Office, and all the benefits accruing therefrom under 35 U.S.C. § 119, the contents of which are incorporated herein in their entirety by reference.

BACKGROUND

1. Field

The present disclosure relates to a positive electrode for a lithium ion secondary battery and a lithium ion secondary battery including the same.

2. Description of the Related Art

Recently, all-solid-state lithium-ion secondary batteries including a lithium ion conductive solid electrolyte have drawn attention. Much attention has been paid to sulfide-based solid electrolytes for use as solid electrolytes of lithium-ion secondary batteries to provide improved lithium-ion conductivity. Nonetheless, there remains a need for improved lithium-ion battery materials.

SUMMARY

Provided is a positive electrode for a lithium ion secondary battery having improved discharge capacity and load characteristics by inhibiting reactions at an interface between a positive active material and a solid electrolyte.

Provided is a lithium ion secondary battery including the positive electrode.

Additional aspects will be set forth in part in the description which follows and, in part, will be apparent from the description, or may be learned by practice of the presented exemplary embodiments.

According to an aspect embodiment, a positive electrode for a lithium ion secondary battery includes a positive electrode particle including a positive active material particle, wherein the positive electrode particle includes a first coating layer on a surface of the positive active material particle wherein the first coating layer includes a carbonaceous material, and a second coating layer on the first coating layer, wherein the second coating layer includes a lithium-containing compound; and a sulfide solid electrolyte contacting the positive electrode particle contacting the positive electrode particle.

The carbonaceous material may include amorphous carbon.

The carbonaceous material may include carbon or amorphous carbon including a hydrocarbon represented by $C_{4n+6}H_{4n+12}$, where n is a positive integer.

The carbonaceous material may include diamond like carbon (DLC).

The DLC may include hydrogen atoms in an amount in a range of about 1 atomic percent to about 50 atomic percent.

The DLC may include carbon atoms having $sp^2$ hybrid bonds and carbon atoms having $sp^3$ hybrid bonds, wherein a content of the carbon atoms having $sp^3$ hybrid bonds in the DLC is in a range of about 10% to about 100%, based on a total carbon atom content of the DLC.

A thickness of the first coating layer is in a range of about 1 nm to about 50 nm.

The lithium-containing compound may include at least one selected from a lithium-containing oxide and a lithium-containing phosphorus oxide.

The lithium-containing oxide may include $aLi_2O-ZrO_2$, where $0.1 \leq a \leq 2.0$.

A sum of a thickness of the first coating layer and a thickness of the second coating layer is in a range of about 1 nm to about 500 nm.

The positive active material particle may include a lithium salt of a transition metal oxide having a layered rock-salt type structure.

The lithium salt of a transition metal oxide having a layered rock-salt type structure may be $LiNi_xCo_yM_zO_2$, where M is Al or Mn, $0<x<1$, $0<y<1$, and $x+y+z=1$.

The sulfide-based solid electrolyte may include at least sulfur and lithium and may further include at least one selected from phosphorus (P), silicon (Si), boron (B), aluminum (Al), germanium (Ge), zinc (Zn), gallium (Ga), indium (In), and a halogen element.

The sulfide-based solid electrolyte may include $Li_2S$ and $P_2S_5$.

Also disclosed is a lithium ion secondary battery including the positive electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
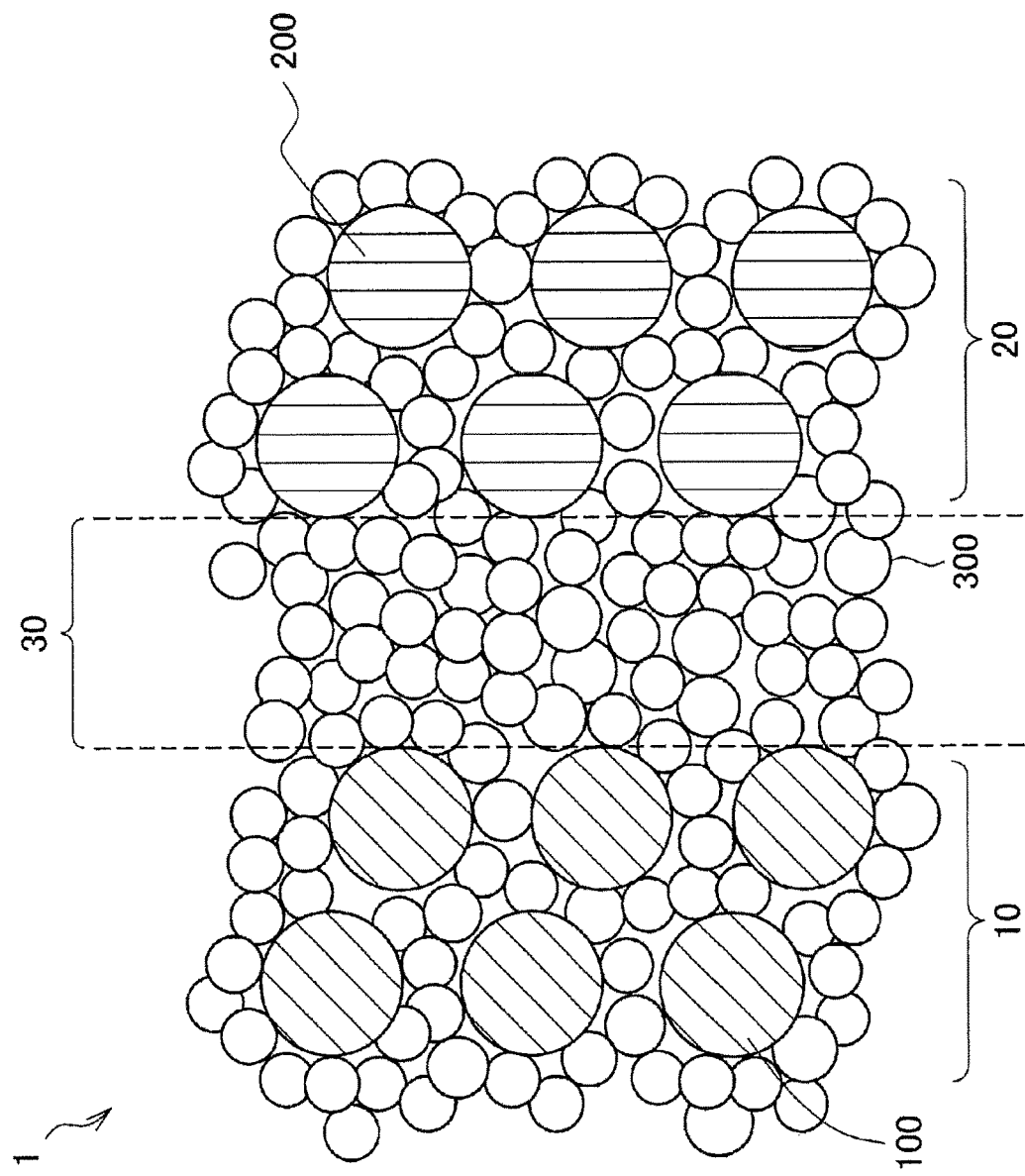
FIG. 1 is a schematic cross-sectional view illustrating a configuration of layers of an embodiment of a lithium ion secondary battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

Hereinafter an exemplary embodiment will be described below with reference to the attached drawings. In addition, in the present specification and drawings, like reference numerals in the drawings denote like elements, and thus their description will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a sulfide-based solid electrolyte is used, reactions may occur at an interface between a positive active material and the sulfide-based solid electrolyte when the battery is charged so that resistive components may be generated at the interface between the positive active material and the sulfide-based solid electrolyte. In this case, the resistance at the interface between the positive active material and the solid electrolyte may increase and lithium ion conductivity may decrease, and thus, the output of the all-solid-state lithium ion secondary battery may decrease.

Therefore, there is a need for a method of reducing generation of resistive components at the interface between a positive active material and a solid electrolyte in a lithium-ion secondary battery by inhibiting reactions at the interface and improving the characteristics of the lithium-ion secondary battery.

"Halogen" means one of the elements of Group 17 of the periodic table (e.g., fluorine, chlorine, bromine, iodine, and astatine).

"Rare earth" means the fifteen lanthanide elements, i.e., atomic numbers 57 to 71, plus scandium and yttrium.

The "lanthanide elements" means the chemical elements with atomic numbers 57 to 71.

"Transition metal" as defined herein refers to an element of Groups 3 to 11 of the Periodic Table of the Elements.

1. Lithium Ion Secondary Battery

A lithium ion secondary battery 1 according to an embodiment is an all-solid-state lithium ion secondary battery including a solid electrolyte as an electrolyte.

In an all-solid-state lithium ion secondary battery having a solid electrolyte, because a positive active material and an electrolyte are each a solid, penetration of the electrolyte into the interior of the positive active material is more difficult than that of an organic electrolyte. Thus, in an all-solid-state lithium ion secondary battery, an area of the interface between the positive active material and the electrolyte may decrease, and accordingly, there is a need to provide a pathway for lithium ions and electrons between the positive active material and the solid electrolyte.

A composite layer including a positive active material and a solid electrolyte has been proposed for the positive electrode layer to increase the area of the interface between the positive active material and the solid electrolyte.

However, when a sulfide-based solid electrolyte is used in a battery, resistive components may be generated at an interface between the positive active material and the solid electrolyte while charging the battery, increasing the resistance of the interface between the positive active material and the solid electrolyte. Furthermore, a reaction at an interface between a positive active material and a solid electrolyte, in particular, when the load of an all-solid-state lithium ion secondary battery is large, (for example, when charging an all-solid-state lithium ion secondary battery with a high voltage or when discharging an all-solid-state lithium ion secondary battery with a high current) may have a high resistance, making high rate charge or discharge difficult.

Thus, in an all-solid-state lithium ion secondary battery using a sulfide-based solid electrolyte, it is desirable to prevent generation of resistive components at the interface between a positive active material and a solid electrolyte.

According to an embodiment, the lithium ion secondary battery 1 may include a first coating layer 102 including a carbonaceous material and on a surface of a positive active material particle 101, and a second coating layer 103 including a lithium-containing compound on the first coating layer 102. When the foregoing configuration is used, direct contact between the positive active material particle 101 and a solid electrolyte 300 is prevented due to the first coating layer 102 and the second coating layer 103, and generation of a resistive component at an interface of the positive active material particle 101 and the solid electrolyte 300 may be suppressed.

The first coating layer 102 including a carbonaceous material may prevent a structural change of the positive active material particle 101, and the second coating layer 103 including a lithium-containing compound may prevent a reaction of the positive active material particle 101 and the solid electrolyte 300, and may provide lithium ion conductivity. Therefore, the first coating layer 102 and the second coating layer 103 may provide an improved pathway for migration of lithium ions between the positive active material particle 101 and the solid electrolyte 300, thereby increasing performance of the lithium ion secondary battery 1.

Particularly, in the lithium ion secondary battery 1 according to an embodiment, the first coating layer 102, which is on a surface of the positive active material particle 101, may include a carbonaceous material (for example, an amorphous carbon) having high thermal and chemical stability. Accordingly, a structural change of the positive active material particle 101, e.g., as may occur during charging and discharging, may be effectively prevented. Furthermore, in the lithium ion secondary battery 1 according to an embodiment, the second coating layer 103, which is on the outermost surface of a positive electrode particle 100, may include a lithium-containing compound. Accordingly, generation of a highly-resistive layer at the interface of the positive electrode particle 100 and the solid electrolyte 300 may be suppressed, thus increasing lithium ion conductivity. The lithium ion secondary battery 1 may have improved discharge capacity and load characteristics when having the disclosed structure.

In addition, as verified in the following Examples, when the first coating layer 102, which is on a surface of the positive active material particle 101, includes a lithium-containing compound, and the second coating layer 103, which is on the first coating layer 102, includes a carbonaceous material, the above described effect is not observed, and battery characteristics may decrease.

Configuration of Lithium Ion Secondary Battery

Figure 2:
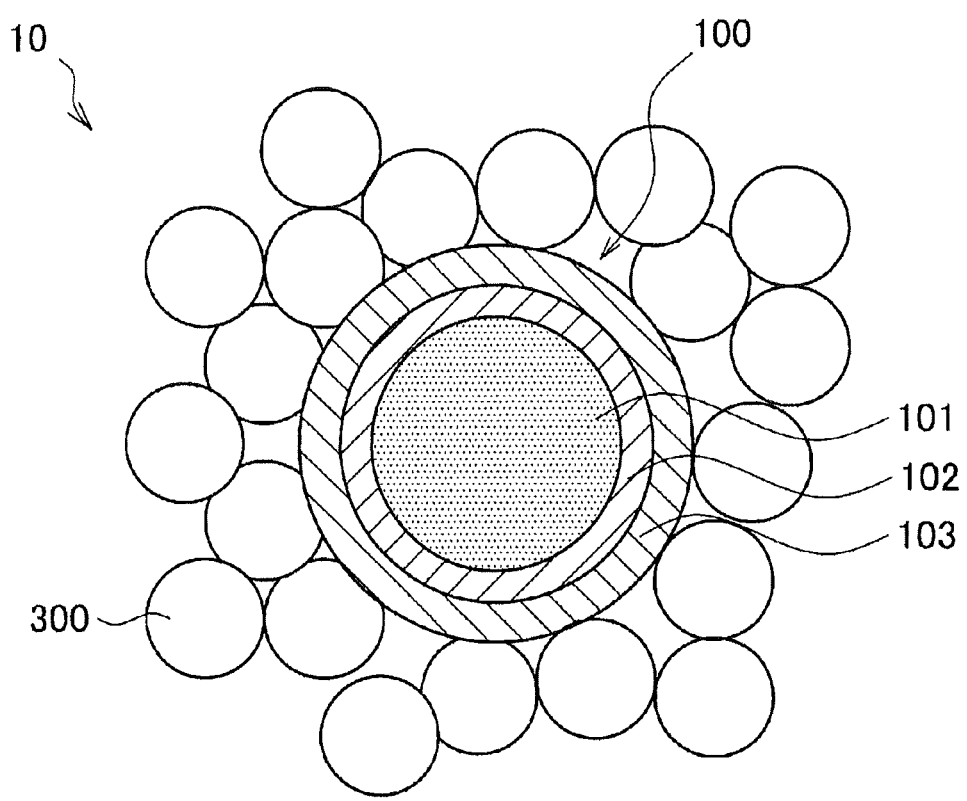
FIG. 2 is a schematic cross-sectional view illustrating a configuration of an embodiment of a positive electrode particle.

Next, referring to FIGS. 1 and 2, the configuration of the lithium ion secondary battery 1 is further described. FIG. 1 is a schematic cross-sectional view illustrating a configuration of layers of the lithium ion secondary battery 1 according to an embodiment. FIG. 2 is a schematic cross-sectional view illustrating a configuration of the positive electrode particle 100 of the lithium ion secondary battery 1 according to an embodiment.

As shown in FIG. 1, the lithium ion secondary battery 1 has a structure in which a positive electrode layer 10, a negative electrode layer 20, and a solid electrolyte layer 30 between the positive electrode layer 10 and the negative electrode layer 20 are stacked.

Positive Electrode Layer

The positive electrode layer 10 may include the positive electrode particle 100 and the solid electrolyte 300. The positive electrode layer 10 may further include a conductive agent to increase electron conductivity. The solid electrolyte 300 will be described below along with the solid electrolyte layer 30.

As shown in FIG. 2, the positive electrode particle 100 may include the positive active material particle 101, the first coating layer 102 on a surface of the positive active material particle 101, and the second coating layer 103 on the first coating layer 102.

Positive Active Material Particle

The positive active material particle 101 may include a positive active material having a higher charge-discharge potential than that of a negative active material, which will be further described below, and provides for reversible intercalation and deintercalation of lithium ions.

The positive active material 101 may be any suitable material used in the art, without limitation. Examples of the positive active material 101 may include one of the compounds represented by the following formulae: $Li_aA_{1-b}B'_bD_2$ (where $0.90 \leq a \leq 1$, and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$, and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$.); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$.); $Li_aMn_2G_bO_4$ (where $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$).

In the formulae above, A is at least one selected from nickel (Ni), cobalt (Co), and manganese (Mn); B' is at least one selected from aluminum (Al), nickel (Ni), cobalt (Co), manganese (Mn), chromium (Cr), iron (Fe), magnesium (Mg), strontium (Sr), vanadium (V), and a rare earth element D is at least one selected from oxygen (0), fluorine (F), sulfur (S), and phosphorus (P); E is at least one selected from cobalt (Co), and manganese (Mn); F' is at least one selected from fluorine (F), sulfur (S), and phosphorus (P); G is at least one selected from aluminum (Al), chromium (Cr), manganese (Mn), iron (Fe), magnesium (Mg), lanthanum (LA, cerium (Ce), strontium (Sr), and vanadium (V); Q is at least one selected from titanium (Ti), molybdenum (Mo), manganese (Mn), or a combination thereof; I' is chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

The compounds listed above as positive active materials may have a surface coating layer (hereinafter, a "coating layer"). Alternatively, a mixture of a compound without having a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be at least one selected from magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), and zirconium (Zr). The coating layer may be formed by using any suitable method that does not adversely affect the physical properties of the positive active material when a compound of the coating element is used. For example, the coating layer may be formed by using a spray coating method, or a dipping method. Further details can be determined by one of skill in the art without undue experimentation, and thus a detailed description thereof will be omitted.

In an embodiment, examples of the positive active material particle 101 include a lithium salts such as at least one selected from lithium cobalt oxide (hereinafter referred to as "LCO"), lithium nickel oxide, lithium nickel cobalt oxide, lithium nickel cobalt aluminum oxide (hereinafter referred to as "NCA"), lithium nickel cobalt manganese oxide (hereinafter referred to as "NCM"), lithium manganate, lithium iron phosphate, nickel sulfide, copper sulfide, sulfur, iron oxide, vanadium oxide, and the like. The positive active material may be used alone or in a combination thereof.

The positive active material particle 101 may include a lithium salt of a transition metal oxide having a layered rock-salt type structure. As used herein, the term "layered" refers to a shape of a thin sheet. The expression "rock-salt type structure" refers to a sodium chloride-type structure as a crystal structure in which face-centered cubic lattices respectively formed of anions and cations are shifted by half the side of each unit lattice.

Examples of the lithium salt of a transition metal oxide having a layered rock-salt type structure may be a lithium salt of a ternary transition metal oxide represented by the formula $LiNi_xCo_yAl_zO_2$ ("NCA") or $LiNi_xCo_yMn_zO_2$ ("NCM"), wherein $0<x<1$, $0<y<1$, $0<z<1$, and $x+y+z=1$.

When the lithium salt of the ternary transition metal oxides having a layered rock-salt type structure is included in the positive active material particle 101, the lithium-ion secondary battery 1 may have improved energy density and improved thermal stability.

In this regard, in the positive electrode particle 100, the first coating layer 102 and the second coating layer 103 may prevent a structural change of the positive active material particle 101 and may prevent an undesirable reaction at the interface between the positive active material particle 101 and the solid electrolyte 300, thereby improving battery characteristics of the lithium ion secondary battery 1.

Further, when the positive active material particle 101 includes a lithium salt of the ternary transition metal oxide, such as NCA or NCM and including nickel (Ni) as a positive active material, the capacity density of the lithium ion secondary battery 1 may increase, thereby reducing metal elution from the positive active material. Accordingly, the lithium ion secondary battery 1 may have improved long-term reliability and cycle characteristics while charging the lithium ion secondary battery 1.

The positive active material particle 101 may have a shape such as a spherical shape or an oval shape. The average particle diameter of the positive active material particle 101 may be in the range of about 0.1 micrometer (μm) to about 50 μm, about 0.5 μm to about 40 μm, or about 1 μm to about 30 μm. Here, the "average particle diameter" refers to a number average particle diameter in the distribution of particle diameters obtained by a light scattering method and may be measured by a particle diameter distribution meter and the like.

In the positive electrode layer 10, the amount of the positive active material particle 101 may be in a range of about 10% by weight to about 99% by weight, for example, in the range of about 20% by weight to about 90% by weight, based on the total weight of the positive electrode layer 10.

First Coating Layer

The first coating layer 102 may be on a surface of the positive active material particle 101 and include a carbonaceous material. Due to high thermal and chemical stability of a carbonaceous material, a structure change of the positive active material particle 101 may be prevented.

Particularly, when the first coating layer 102 on a surface of the positive active material particle 101 includes a carbonaceous material having high thermal and chemical stability, while the second coating layer 103 does not include a carbonaceous material, a structure change of the positive active material particle 101 may be effectively prevented.

As for a carbonaceous material, any suitable carbonaceous material may be used as long as the carbonaceous material is chemically stable. For example, an amorphous carbon, e.g., diamond-like carbon (DLC) may be used. In diamond-like carbon, the carbon atoms are arranged in a cubic lattice, and about 10% to 100%, or about 75% to about 99.99% of the carbon atoms in the diamond-like carbon have $sp^3$ hybridization. In an embodiment, the diamond-like carbon may be tetrahedral amorphous carbon.

In an embodiment, the first coating layer 102 may be a layer including amorphous carbon. In this regard, the amorphous carbon is carbon including carbon as a primary component and has an amorphous structure in which carbon atoms bonded to each other by $sp^3$ hybrid orbitals corresponding to the structure of diamond and carbon atoms bonded to each other by $sp^2$ hybrid orbitals corresponding to the structure of graphite are non-uniformly mixed. In addition, in the following description, a bond formed by the $sp^3$ hybrid orbitals may be referred to as a $sp^3$ hybrid bond and a bond formed by the $sp^2$ hybrid orbitals may be referred to as a $sp^2$ hybrid bond.

For example, the first coating layer 102 may comprise amorphous carbon, such as DLC or a hydrocarbon represented by the formula $C_{4n+6}H_{4n+12}$, where n is a positive integer, e.g., 1 to 30. Examples of the hydrocarbon represented by $C_{4n+6}H_{4n+12}$ (where n is a positive integer) include adamantane, diamantane, triamantane, tetramantane, pentamantane, hexamantane, heptamantane, octamantane, nonamantane, decamantane, and undecamantane. Further, when the amorphous carbon constituting the first coating layer 102 includes carbon as a primary component (for example, when the content of carbon atoms is about 50 atomic percent (atom %) or more, e.g., about 50 atom % to about 99.9 atom %, based on the total weight of the amorphous carbon), atoms other than carbon atoms may be further included, e.g., hydrogen atoms (H) or silicon atoms (Si).

The first coating layer 102 may be a layer including DLC. A DLC layer may be an amorphous layer having a mixed form of a structure of diamond and a structure of graphite, including carbon and hydrogen; or carbon only. When the first coating layer 102 is used, a structural change of the positive active material particle 101 may further be prevented.

In an embodiment, DLC included in the first coating layer 102 may include hydrogen atoms. The content of hydrogen atoms included in the DLC may be, for example, in a range of about 1 atom % to about 50 atom %, in some embodiments, in a range of about 10 atom % to about 30 atom %. When the content of hydrogen atoms included in the first coating layer 102 is within these ranges, a decrease of stability of the first coating layer 102 may be prevented.

The content of hydrogen atoms in DLC included in the first coating layer 102 may be measured using any suitable method, e.g., an inductively coupled plasma (ICP) spectrometry, (for example, an ICP emission spectrometry or an ICP mass spectrometry).

The thickness of the first coating layer 102 may be, for example, in a range of about 1 nm to about 50 nm, about 2 μm to about 40 μm, or about 4 μm to about 30 μm. If the thickness of the first coating layer 102 is within these ranges, a structure change of the positive active material particle 101 may be prevented without decreasing lithium ion conductivity. If the thickness of the first coating layer 102 is less than 1 nm, an inhibitory effect of a structural change may not be sufficient. If the thickness of the first coating layer 102 is greater than 50 nm, a lithium ion conductivity between the positive active material particle 101 and the solid electrolyte 300 may be reduced.

The thickness of the first coating layer 102 may be measured by using, e.g., a cross-sectional image of a transmission electron microscope (TEM).

In an embodiment, as is further described above, DLC included in the first coating layer 102 may include carbon atoms having $sp^2$ hybrid bonds and carbon atoms having $sp^3$ hybrid bonds. In this regard, the content of carbon atoms having $sp^3$ hybrid bonds in DLC included in the first coating layer 102 may be in a range of about 10% to about 100%, for example, about 30% to about 100%, for example, about 40% to about 100%, based on the total carbon atom content of DLC.

When the content of carbon atoms having $sp^3$ hybrid bonds in DLC is within these ranges, a structural change of the positive active material particle 101 may be effectively prevented. Accordingly, when using the DLC, the lithium ion secondary battery 1 may have improved discharge capacity and load characteristics.

In this regard, a ratio of the carbon atoms having $sp^2$ hybrid bonds to carbon atoms having $sp^3$ hybrid bonds may be obtained using an electron energy-loss spectroscopy (EELS) by using a TEM.

Figure 3:
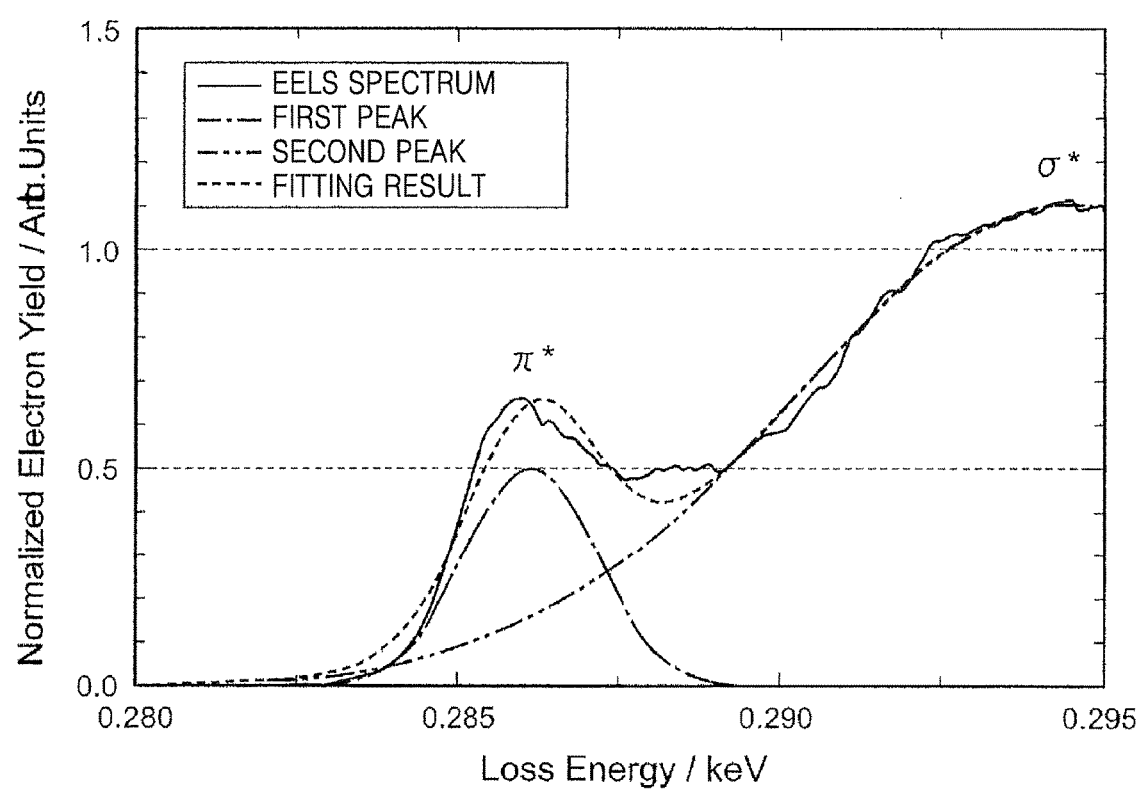
FIG. 3 is a graph of normalized electron yield (arbitrary units) versus loss energy (kiloelectron volts, keV) showing results of a TEM-EELS analysis of an embodiment of a coating layer of a positive electrode particle and a fitting result thereof.

Hereinafter a method of calculating a ratio of carbon atoms having $sp^2$ hybrid bonds to carbon atoms having $sp^3$ hybrid bonds included in the DLC will be described below, with reference to FIG. 3. FIG. 3 is a graph showing the results of TEM-EELS analysis of the first coating layer 102 of the positive electrode particle 100, and a fitting result thereof.

In addition, FIG. 3 illustrates an electron energy range of 0.280 kiloelectron volts (keV) to 0.295 keV in the EELS spectrum of K-electron energy loss near edge structure of carbon. In FIG. 3, the x-axis indicates loss energy (keV), and the y-axis indicates intensity of the spectrum.

In FIG. 3, the solid line indicates an EELS spectrum of the coating layer 102. As shown with the solid line in FIG. 3, the EELS spectrum of DLC has a first peak in a range of about 0.284 keV to about 0.286 keV and a second peak in a range of about 0.292 keV to about 0.295 keV. Here, the first peak corresponds to a π-bond of carbon atoms, and the second peak corresponds to an σ-bond of carbon atoms.

In FIG. 3, the first and second peaks are separated from the EELS spectrum shown in a solid line. In detail, the spectrum of the first peak shown in a dash-dotted line and the spectrum of the second peak shown in a dash-double-dotted line may be calculated. The two spectra may be combined to fit the EELS spectrum shown in a solid line. Thereafter, a peak area ratio of the first peak shown in a dash-dotted line of the spectrum shown in a dotted line to the second peak shown in a dash-double-dotted line of the spectrum shown in a dotted line (that is, an area of the first peak/an area of the second peak) may be calculated.

Also, a peak of each of diamond and graphite may be measured, and then, a peak area ratio of diamond to graphite may be calculated. In this regard, carbon atoms included in diamond are bonded to each other by $sp^3$ hybrid bonds, and carbon atoms included in graphite are bonded to each other by $sp^2$ hybrid bonds. Thus, a relative value of the peak area ratio in DLC may be calculated by setting the peak area ratio in diamond to 0 and setting the peak area ratio in graphite to 100 to calculate a ratio of carbon atoms having $sp^2$ hybrid bonds to carbon atoms having $sp^3$ hybrid bonds.

However, a method of calculating the ratio of carbon atoms having hybrid bonds to $sp^3$ carbon atoms having hybrid bonds in DLC included in the first coating layer 102 $sp^2$ is not limited to TEM-EELS analysis. For example, X-ray Photoelectron Spectroscopy or Raman spectroscopy may also be used to calculate the ratio of carbon atoms having hybrid bonds to $sp^3$ carbon atoms having hybrid bonds in DLC.

Second Coating Layer

The second coating layer 103 may be on the first coating layer 102 and include a lithium-containing compound. By additionally disposing the second coating layer 103 over the positive active material particle 101, a reaction between the positive active material particle 101 and the solid electrolyte 300 may further be suppressed.

In an embodiment, when the second coating layer 103 is on the outermost surface of the positive electrode particle 100 and includes a lithium-containing compound having high lithium ion conductivity, while the first coating layer 102 does not include a lithium-containing compound, a reaction between the positive active material particle 101 and the solid electrolyte 300 may be prevented, maintaining lithium ion conductivity.

Examples of the lithium-containing compound include a lithium-containing oxide and a lithium-containing phosphorus oxide. Examples of the lithium-containing oxide include a lithium zirconium oxide (Li—Zr—O), a lithium niobium oxide (Li—Nb—O), a lithium titanium oxide (Li—Ti—O), and a lithium aluminum oxide (Li—Al—O). Examples of the lithium-containing phosphorus oxide include a lithium titanium phosphorous oxide (Li—Ti—PO$_4$) and lithium zirconium phosphorous oxide (Li—Zr—PO$_4$). When the second coating layer 103 is used, generation of a resistive layer at the interface between the positive electrode particle 100 and the solid electrolyte 300 may be prevented, improving lithium ion conductivity between the positive active material particle 101 and the solid electrolyte 300.

In particular, the second coating layer 103 may include an aLi$_2$O—ZrO$_2$ where 0.1≤a≤2.0. Since the aLi$_2$O—ZrO$_2$ (hereinafter referred to as "LZO") is chemically stable, when the aLi$_2$O—ZrO$_2$ is included in the second coating layer 103, a reaction between the positive active material particle 101 and the solid electrolyte 300 may further be prevented.

In this regard, the $aLi_2O$—$ZrO_2$ may be a composite oxide of $Li_2O$ and $ZrO_2$, where $0.1 \leq a \leq 2.0$. When a is within this range, battery characteristics of the lithium ion secondary battery 1 may be improved.

Further, the second coating layer 103 may be on the positive active material particle 101 such that a ratio of the $aLi_2O$—$ZrO_2$ to the positive active material particle 101 may be in a range of about 0.1 mole percent (mol %) to about 2 mol %, about 0.5 mol % to about 1.5 mol %, or about 0.1 mol % to about 1 mol %. When the coating amount of the second coating layer 103 is within this range, discharge capacity and load characteristics may be improved. In an embodiment, when the coating amount of the second coating layer 103 is less than 0.1 mol %, the inhibitory effect of a reaction between the positive active material particle 101 and the solid electrolyte 300 may not be sufficient. When the coating amount of the second coating layer 103 is more than 2 mol %, lithium ion conductivity between the positive active material particle 101 and the solid electrolyte 300 may be reduced.

In some embodiments, the total thickness of the first coating layer 102 and the second coating layer 103 may be in a range of about 1 nm to about 500 nm, about 2 nm to about 400 nm, or about 4 nm to about 300 nm. When the total thickness of the first coating layer 102 and the second coating layer 103 is within this range, a reaction between the positive active material particle 101 and the solid electrolyte 300 may further be prevented without decreasing lithium ion conductivity. When the total thickness of the first coating layer 102 and the second coating layer 103 is less than 1 nm, the inhibitory effect of a reaction between the positive active material particle 101 and the solid electrolyte 300 may not be sufficient. When the total thickness of the first coating layer 102 and the second coating layer 103 is more than 500 nm, lithium ion conductivity between the positive active material particle 101 and the solid electrolyte 300 may be reduced.

In some embodiments, the first coating layer 102 and the second coating layer 103 may be on at least one portion of the positive active material particle 101. In other words, the first coating layer 102 and the second coating layer 103 may be over the whole surface of the positive active material particle 101, or the first coating layer 102 and the second coating layer 103 may be over a portion of a surface of the positive active material particle 101.

The positive electrode layer 10 may further include an additive, such as a conductive agent, a binder, a filler, a dispersing agent, and an ion-conductive agent, in addition to the positive active material particle 100 and the solid electrolyte 300.

Examples of the conductive agent that may be further included in the positive electrode layer include graphite, carbon black, acetylene black, Ketjen black, carbon fiber, or metal powder. Examples of the binder that may be further included in the positive electrode layer 10 include polytetrafluoroethylene, polyvinylidene fluoride, or polyethylene. Moreover, a filler, a dispersing agent, or ion conductive agent that may be included in the positive electrode layer 10 may be any suitable material for an electrode in lithium ion secondary batteries.

Negative Electrode Layer

As shown in FIG. 1, the negative electrode layer 20 may include a negative electrode particle 200 and the solid electrolyte 300. The solid electrolyte 300 is further disclosed below along with the solid electrolyte layer 30.

The negative active material particle 200 may include a material having a lower charge-discharge potential than that of the positive active material particle 101, that is alloyable with lithium, and provides for reversible intercalation and deintercalation of lithium ions.

The negative active material may any suitable material for a negative active material of lithium secondary battery. The negative active material may include at least one selected from lithium metal, a metal alloyable with lithium, a transition metal oxide, a non-transition metal oxide, and a material that allows doping or undoping of lithium, and a carbonaceous material.

The metal alloyable with lithium may include Si, Sn, Al, In, Ge, Pb, Bi, Sb a Si—Y' alloy (wherein Y' is at least one selected from an alkali metal, an alkaline earth metal, a Group XIII element, a Group XIV elements, a transition metal, and a rare earth element (except for Si)), a Sn—Y" alloy (Y" is at least one selected from an alkali metal, an alkaline earth metal, a Group XIII element, a Group XIV element, a transition metal, or a rare earth element (except for Sn)), and the like. Y' and Y" may each independently be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

Examples of the transition metal include at least one selected from tungsten oxide, molybdenum oxide, titanium oxide, lithium titanium oxide, vanadium oxide, and lithium vanadium oxide.

The non-transition metal oxide may be, for example, $SnO_2$, $SiO_x$ ($0<x<2$), and the like.

The material that allows doping and undoping of lithium ions may be, for example, Sn, $SnO_2$, and Sn—Y" alloy (wherein Y" is at least one selected from an alkali metal, an alkaline earth metal, a Group XI element, a Group XII element, a Group XIII element, a Group XIV element, a Group XV element, a Group XVI element, a transition metal, and a rare earth element (except for Sn)). Y" ma at least one selected from y be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

The carbonaceous material may comprise at least one selected from a crystalline carbon and an amorphous carbon. Examples of the carbonaceous material may include at least one selected from natural graphite, artificial graphite, graphite carbon fiber, resin-sintered carbon, carbon grown by vapor-phase thermal decomposition, coke, mesophase carbon microbeads (MCMBs), furfuryl alcohol resin-sintered carbon, polyacene, pitch-based carbon fibers (PCF), vapor grown carbon fiber, soft carbon (low temperature sintered carbon) or hard carbon, and mesophase pitch carbide. The negative active material may be used alone or in a combination thereof.

The carbonaceous material may have at least one selected from a spherical shape, a plate shape, a flake shape, and a fibrous shape.

The negative electrode layer 20 may further include an additive, such as a conductive agent, a binder, a filler, a dispersing agent, and an ion-conductive agent, in addition to the negative active material particle 200 and the solid electrolyte 300.

The additive is disclosed in conjunction with the description of the positive electrode layer 10, and additional description thereof is not repeated for clarity. The additive included in the negative electrode layer 20 may be the same as those added to the positive electrode layer 10.

Solid Electrolyte Layer

The solid electrolyte layer 30 may include the solid electrolyte 300 between the positive electrode layer 10 and the negative electrode layer 20.

The solid electrolyte 300 may include a sulfide-based solid electrolyte. The sulfide-based solid electrolyte material may include at least sulfur and lithium and may further include at least one selected from phosphorus (P), silicon (Si), boron (B), aluminum (Al), germanium (Ge), zinc (Zn), gallium (Ga), indium (In), and a halogen element.

Particularly, the solid electrolyte 300 may include lithium sulfide as the sulfide-based solid electrolyte material and may comprise at least one selected from silicon sulfide, phosphorus sulfide, and boron sulfide as a second component. For example, the sulfide-based solid electrolyte may be $Li_2S-P_2S_5$.

The sulfide-based solid electrolyte material may further include a sulfide such as $SiS_2$, $GeS_2$, and $B_2S_3$ in addition to the $Li_2S-P_2S_5$, which has a greater lithium-ion conductivity than other inorganic compounds. In addition, the sulfide-based solid electrolyte may be an inorganic solid electrolyte prepared by adding at least one selected from $Li_3PO_4$, a halogen compound, LISICON, $Li_{3+y}PO_{4-x}N_x$ (LIPON), $Li_{3.25}Ge_{0.25}P_{0.75}S_4$ (Thio-LISICON), and $Li_{3.25}Ge_{0.25}P_{0.75}S_4$ (LATP) to an inorganic solid electrolyte prepared by combining $Li_2S-P_2S_5$, $SiS_2$, $GeS_2$, $B_2S_3$, and the like.

Examples of the sulfide-based solid electrolyte material may include $Li_2S-P_2S_5$, $Li_2S-P_2S_5-LiX$ (where X is a halogen atom), $Li_2S-P_2S_5-Li2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are positive integers and Z is Ge, Zn, or Ga), $Li_2S-GeS_2$, $Li_2S-SiS_2-Li_3PO_4$, and $Li_2S-SiS_2-Li_pMO_q$ (where p and q are positive integers and M is P, Si, Ge, B, Al, Ga, or In).

In some embodiments, the sulfide-based solid electrolyte material including at least sulfur (S), phosphorus (P), and lithium (Li) may be included in the solid electrolyte 300. For example, a sulfide-based solid electrolyte material including $Li_2S-P_2S_5$ may be used.

When a material including $Li_2S$ and $P_2S_5$ is used as the sulfide-based solid electrolyte material constituting the solid electrolyte 300, a mixing ratio of $Li_2S$ to $P_2S_5$ ($Li_2S:P_2S_5$) may be, for example, about 50:50 to about 90:10 in a molar ratio.

The solid electrolyte 300 may have a shape, e.g., a spherical shape or an oval shape. The particle diameter of the solid electrolyte 300 is not particularly limited. For example, the average particle diameter of the solid electrolyte 300 may be in a range of about 0.01 μm to about 30 μm, in some embodiments, in a range of about 0.1 μm to about 20 μm. As is further disclosed above, the average particle diameter refers to a number average particle diameter in the distribution of particle diameters obtained by a light scattering method.

Hereinbefore the configuration of the lithium ion secondary battery 1 is further disclosed.

Method of Preparing Lithium Ion Secondary Battery

Hereinafter a method of preparing a lithium-ion secondary battery 1, according to an embodiment, will be further described. The lithium-ion secondary battery 1 is prepared by respectively preparing the positive electrode layer 10, the negative electrode layer 20, and the solid electrolyte layer 30, and stacking the layers.

Preparation of Positive Electrode Layer

First, the first coating layer 102 and the second coating layer 103 may be sequentially stacked on a surface of the positive active material particle 101 to prepare the positive electrode particle 100.

The positive active material particle 101 may be prepared by any suitable method. For example, when NCA is used as the positive active material 101, the positive active material 101 may be prepared as follows. First, $Ni(OH)_2$ powder, $Co(OH)_2$ powder, $Al_2O_3.H_2O$ powder, and $LiOH.H_2O$ powder are mixed in the same composition ratio as in the NCA to be generated and the mixture is ground using a ball mill. Continuously, the ground raw material mixture powder is mixed with a dispersing agent, a binder, and the like. A viscosity of the mixture is adjusted and the mixture is molded in the form of a sheet. Then, the molded sheet-shaped product is sintered at a predetermined temperature, and the sintered product is pulverized by using a sieve (mesh) to obtain the positive active material particle 101. In this regard, a particle diameter of the positive active material particle 101 may be adjusted by changing the fineness of the sieve (mesh) used to pulverize the molded product.

Then, the first coating layer 102 may be disposed on a surface of the positive active material particle 101. The first coating layer 102 may be formed by using chemical vapor deposition ("CVD"), such as plasma-enhanced chemical vapor deposition ("PECVD"), ion plating, sputtering, thermal CVD plasma CVD and physical vapor deposition ("PVD"), such as pulse laser deposition ("PLD") and electron beam deposition.

When the first coating layer 102 is formed by plasma CVD, the positive active material 101, on which the first coating layer 102 will be formed, is added to a vacuum reactor, and a reaction gas and a carrier gas are introduced into the vacuum reactor. Then, a plasma is created in the vacuum reactor by discharge, and a hydrocarbon gas ionized by the plasma is attached to the surface of the positive active material particle 101, thereby forming a first coating layer 102 including a carbonaceous material on the surface of the positive active material particle 101.

Examples of the hydrocarbon gas include at least one selected from methane ($CH_4$), ethane ($C_2H_6$), ethylene ($C_2H_4$), acetylene ($C_2H_2$), benzene, toluene, xylene, naphthalene, and cyclohexane. The amount of hydrogen atoms or the ratio of carbon atoms having $sp^2$ hybrid bonds to carbon atoms having $sp^3$ hybrid bonds in the carbonaceous material constituting the first coating layer 102 may be adjusted by changing the types or flow rates of the hydrocarbon gas. The hydrocarbon gas may be used alone selected or in a combination thereof.

For a carrier gas, for example, hydrogen ($H_2$) gas or an inert, gas e.g., argon (Ar) gas may be used. Types and flow rates of the carrier gas may be changed to adjust the amount of hydrogen atoms in the first coating layer 102. For example, when hydrogen gas is used as the carrier gas, the amount of hydrogen atoms in the first coating layer 102 may be adjusted by changing a flow rate of the hydrogen gas with respect to hydrocarbon gas.

The formation of the first coating layer 102 may be performed at a pressure of about 0.01 pascals (Pa) to about 1 Pa and at a temperature in a range of about 100° C. to about 500° C. in a vacuum reactor. In addition, a surface of the positive active material particle 101 may be cleaned and activated, by applying an ion bombardment treatment to the positive active material particle 101 before forming the first coating layer 102.

As described above, the first coating layer 102 may be formed by using PVD. When the first coating layer 102 is formed by PVD, a solid material, such as graphite, glassy-carbon, and DLC may be used as a carbon source. When a solid material not including hydrogen atom is used as the carbon source, for example, hydrogen atoms are added to the first coating layer 102 by supplying a hydrogen gas-containing gas thereto.

Thereafter, the second coating layer 103 may be disposed on the first coating layer 102, which is on the positive active material particle 101. In some embodiments, the second coating layer 103 may be formed as follows:

First, lithium alkoxide and zirconium alkoxide may be stirred and mixed in an organic solvent, e.g., alcohol and water, to provide a coating liquid for the second coating layer 103. Then, the adjusted coating liquid may be added to the positive active material particle 101, on which the first coating layer 102 is formed, and then stirred and mixed with each other. Then, the mixture may be heated and subject to reduced pressure while irradiating the mixture with ultrasound. After the solvent is evaporated, the positive active material particle 101 may be sintered at a selected temperature for a selected duration, thereby forming a second coating layer 103 including a lithium-containing compound on the first coating layer 102.

In some embodiments, after the solvent is evaporated, the positive active material particle 101 may be sintered at a temperature of about 750° C. or less, e.g., about 500° C. to 700° C., for about 0.5 hour to about 3 hours.

By the disclosed method, the positive electrode particle 100, in which the first coating layer 102 and the second coating layer 103 are sequentially stacked, may be prepared.

Afterward, a slurry or paste may be prepared by mixing the prepared positive electrode particle 100, the solid electrolyte 300 prepared following the method described below, and various additives, and then adding a solvent, such as water or an organic solvent. The obtained slurry or paste may be coated on a current collector, dried, and roll-pressed, thereby preparing the positive electrode layer 10.

Preparation of Negative Electrode Layer

The negative electrode layer 20 may be prepared in the same manner as the positive electrode layer 10. A slurry or paste may be prepared by mixing the negative electrode particle 200, the solid electrolyte 300 prepared the method disclosed below, and various additives, and then adding a solvent, such as water, or an organic solvent. The obtained slurry or paste may be coated on a current collector, dried, and roll-pressed, thereby preparing the negative electrode layer 20. The negative electrode particle 200 may be prepared by a known method using the negative active material.

Examples of the current collector for preparing the positive electrode layer 10 and the negative electrode layer 20 include a plate or a foil including at least one selected from indium (In), copper (Cu), magnesium (Mg), stainless steel, titanium (Ti), iron (Fe) cobalt (Co), nickel (Ni), zinc (Zn), aluminum (Al), germanium (Ge), lithium (Li), and an alloy thereof. In some embodiments, the positive electrode layer 10 or the negative electrode layer 20 may be prepared by consolidating a mixture of the positive electrode particle 100 or the negative electrode particle 200 and various additives into pellets without using a current collector.

Preparation of Solid Electrolyte Layer

The solid electrolyte layer 30 may be prepared using the solid electrolyte 300 including a sulfide-based solid electrolyte material.

First, a sulfide-based solid electrolyte material may be prepared by using a melt quenching method or a mechanical milling ("MM") method.

For example, when using the melt quenching method, first, $Li_2S$ and $P_2S_5$ are mixed in a predetermined ratio and the mixture is compressed into pellets. The pellets are reacted at a reaction temperature in a vacuum and quenched to prepare a sulfide-based solid electrolyte material. In this regard, a reaction temperature of the mixture of $Li_2S$ and $P_2S_5$ may be in a range of about 400° m to about 1000° C., for example, in a range of about 800° C. to about 900° C. A reaction time may be in a range of about 0.1 hour to about 12 hours, for example, in a range of about 1 hour to about 12 hours. Furthermore, a temperature during the quenching of the reactants may be equal to or less than about 10° C., for example, equal to or less than about 0° C., and a quenching rate may be in a range of about 1° C./sec to about 10000° C./sec, for example, about 1° C./sec to about 1000° C./sec.

According to the MM method, $Li_2S$ and $P_2S_5$ may be mixed in a predetermined ratio and subject to a reaction while stirring using e.g., a ball mill, thereby preparing a sulfide-based solid electrolyte material. Although the stirring speed and duration during the MM method are not particularly limited, as stirring speed increases, a generation rate of the sulfide-based solid electrolyte material may increase, and as the stirring duration increases, a conversion rate of the raw materials into the sulfide-based solid electrolyte material may increase.

Then, the sulfide-based solid electrolyte material prepared by the melt quenching method or MM method may be thermal-treated at a predetermined temperature and ground to prepare the solid electrolyte 300 in a particle state.

The obtained solid electrolyte 300 may be used to form the solid electrolyte layer 30 by a method for layer formation, such as blasting, aerosol deposition, cold spraying, sputtering, CVD, or spraying. Further, the solid electrolyte layer 30 may be prepared by pressurizing a single particle of the solid electrolyte 300. The solid electrolyte layer 30 may be prepared by mixing the solid electrolyte 300, a solvent, and a binder or a support and pressurizing the mixture. In this regard, a binder or a support may be added to reinforce the strength of the solid electrolyte layer 30 or to prevent a short circuit of the solid electrolyte 300.

Preparation of Lithium Ion Secondary Battery

The prepared positive electrode layer 10, the negative electrode layer 20, and the solid electrolyte layer 30 may be stacked. The solid electrolyte layer 30 may be between the positive electrode layer 10 and the negative electrode layer 20. Then, the stacked layers may be pressurized, thereby preparing the lithium ion secondary battery 1.

3. Example

Hereinafter the lithium ion secondary battery 1 according to an embodiment will be described with reference to Examples and Comparative Examples. However, Examples are for illustrative purpose only, and are not intended to limit the lithium ion secondary battery 1.

Example 1

First, the first coating layer 102 including DLC was formed on a surface of the positive active material particle 101 including $LiNi_{0.8}Co_{0.15}Al_{0.05}O_2$ (NCA, manufactured by Nippon Chemical Industrial Co., Ltd.) by plasma CVD. Particularly, the first coating layer 102 including DLC was formed on a surface of the positive active material particle 101 by performing an ion bombardment treatment for 3 minutes, at a gas pressure of about 0.06 Pa, at a $C_2H_2$/Ar gas flow rate of about 150 sccm/10 sccm, and at a layer temperature of about 200° C. by using a PIG-type plasma CVD device.

A ratio of carbon atoms having $sp^2$ hybrid bonds to carbon atoms having $sp^3$ hybrid bonds in the first coating layer 102 on the surface of the positive active material particle 101 was measured by using a method described above. The ratio of carbon atoms having $sp^2$ hybrid bonds was in a range of about 50% to about 55%. The content of hydrogen atoms in the first coating layer 102 on the surface of the positive active material particle 101 was measured by using an ICP spectrometry, e.g., an ICP emission spectrometry or an ICP mass spectrometry. The result thereof was in a range of about 20 atom % to about 30 atom %. The thickness of the first coating layer 102 was about 5 nm.

Then, lithium methoxide and zirconium propoxide were mixed with an ethanol solution for about 10 minutes. The positive active material particle 101, on which the first coating layer 102 was formed, was added to the mixture solution and stirred and mixed therein for about 15 minutes until a ratio of $Li_2O$—$ZrO_2$ (LZO) to NCA was 0.5 mol %. While irradiating the mixture solution with ultrasound, a solvent was evaporated by using a rotary evaporator. After the evaporation of the solvent, the positive active material particle 101 was sintered at a temperature of about 350° f for about 1 hour under air atmosphere, thereby forming the second coating layer 103 including LZO on the first coating layer 102. The positive electrode particle 100 was prepared by following the above described method.

Next, $Li_2S$ and $P_2S_5$ were mixed at a mole ratio of about 80:20 and mechanically milled to prepare the solid electrolyte 300.

Then, graphite, the solid electrolyte 300, and carbon nanofiber (conductor) were mixed at a weight ratio of about 60:35:5. 15 mg of the mixture was stacked in a cell container. The surface thereof was trimmed by using a molding device, thereby forming the negative electrode layer 20. Then, 70 mg of the solid electrolyte 300 was stacked on the negative electrode layer 20, and the surface thereof was trimmed by using a molding device, thereby forming the solid electrolyte layer 30. The prepared positive electrode particle 100, the solid electrolyte 300, and carbon nanofiber (conductor) were mixed at a weight ratio of about 60:35:5. 15 mg of the mixture was stacked on the solid electrolyte layer 30. The surface thereof was trimmed by using a molding device, thereby forming the positive electrode layer 10.

Then, a pressure of 3 tons per square centimeter (t/cm$_2$) was applied to the stack structure of the negative electrode layer 20, the solid electrolyte layer 30, and the positive electrode layer 10 contained in the cell container to prepare pellets, thereby obtaining a test cell of Example 1.

Comparative Example 1

A test cell of Comparative Example 1 was prepared in the same manner as in Example 1, except that the first coating layer 102 and the second coating layer 103 were not formed on the positive active material particle 101, and the positive active material particle 101 was used as the positive electrode particle 100.

Comparative Example 2

A test cell of Comparative Example 2 was prepared in the same manner as in Example 1, except that the first coating layer 102 was not formed on the positive active material particle 101, the second coating layer 103 was formed on the positive active material particle 101, and the positive active material particle 101 was used as the positive electrode particle 100.

Comparative Example 3

A test cell of Comparative Example 3 was prepared in the same manner as in Example 1, except that the positive active material particle 101 in which the first coating layer 102 was stacked on the second coating layer 103 was used as the positive electrode particle 100. That is, the second coating layer 103 including $Li_2O$—$ZrO_2$ was formed on a surface of the positive active material particle 101, the first coating layer 102 including DLC was formed on the second coating layer 103, and the positive electrode particle 100 was used to prepared the test cell of Comparative Example 3.

Comparative Example 4

A test cell of Comparative Example 4 was prepared in the same manner as in Example 1, except that the second coating layer 103 was not formed on the positive active material particle 101, the first coating layer 102 was formed on the positive active material particle 101, and the positive active material particle 101 was used as the positive electrode particle 100.

Evaluation

The test cells respectively prepared according to Example 1 and Comparative Examples 1 to 3 were charged at a rate of about 0.05 C at a temperature of about until the voltage reached an upper limit of about 4.0 volts (V), and initial discharge capacity was measure by discharging at a rate of about 0.05 C until the voltage reached a lower limit of about 2.5 V. The discharge capacity of the test cells prepared according to Example 1 and Comparative Examples 1 and 2 were measured by charging and discharging each of the test cells at a constant current of about 0.05 C, 0.5 C, and 1.0 C, and load characteristics thereof were evaluate. In addition, impedance of the each of the test cells prepared according to Example 1 and Comparative Examples 1, 2, and 4 were measured at a upper voltage of about 4.0 V, 4.1 V, and 4.2 V of charging state to evaluate the internal resistance.

"DLC" in the "coat material" column in Tables 1 to 3 indicates the positive active material particle 101 including DLC on the surface thereof, and "LZO" indicates the positive active material particle 101 including LZO on the surface thereof. "DLC/LZO" indicates the positive active material particle 101 in which DLC was formed on the surface thereof, and LZO was formed on the surface of the DLC. "-" indicates that no coating layer was formed on a surface of the positive active material particle 101.

The results of evaluation upon initial discharge capacity are shown in Table 1.

TABLE 1

| | Coating material | Initial discharge capacity [mAh/g] |
|---|---|---|
| Example 1 | DLC/LZO | 122.94 |
| Comparative Example 1 | — | 110.88 |
| Comparative Example 2 | LZO | 119.26 |
| Comparative Example 3 | LZO/DLC | 111.31 |

Referring to Table 1, it was found that the test cell of Example 1 had increased initial discharge capacity compared to those of Comparative Examples 1 to 3. In particular, it was found that the test cell of Example 1 including the first coating layer 102 including DLC on the surface of the positive active material particle 101 and the second coating layer 103 including LZO had increased initial discharge capacity compared to those of Comparative Examples 1 and 2, which did not include the two layers. In addition, the test cell of Example 1 was found to have increased initial discharge capacity compared to that of Comparative Example 3, in which the second coating layer 103 was formed on the surface of the positive active material particle 101 and the first coating layer 102 was formed on the second coating layer 103.

The results of load characteristics evaluation are shown in Table 2. Here, "load characteristics (0.5 C/0.05 C)" indicates a value obtained by dividing discharge capacity at 0.5 C by discharge capacity at 0.05 C, "load characteristics (1.0 C/0.05 C)" indicates a value obtained by dividing discharge capacity at 1 C by discharge capacity at 0.05 C.

TABLE 2

| | Coating material | 0.05 C Discharging capacity [mAh/g] | 0.5 C Discharging capacity [mAh/g] | 1.0 C Discharging capacity [mAh/g] | Load characteristics (0.5 C/0.05 C) | Load characteristics (1.0 C/0.05 C) |
|---|---|---|---|---|---|---|
| Example 1 | DLC/LZO | 128.22 | 93.14 | 78.00 | 0.73 | 0.61 |
| Comparative Example 1 | — | 110.88 | 64.25 | 37.15 | 0.58 | 0.34 |
| Comparative Example 2 | LZO | 126.02 | 88.25 | 70.82 | 0.70 | 0.56 |

Referring to Table 2, the test cell of Example 1 was found to have improved load characteristics compared to those of Comparative Examples 1 and 2. In particular, it was found that a decrease of a discharge capacity during the test cell discharge at a high current was suppressed in the test cell of Example 1 compared to those of Comparative Examples 1 and 2, and even when the load (that is, the discharge current) of the lithium ion secondary battery was large, the test cell had satisfactory characteristics.

The results of internal resistance evaluation are shown in Table 3.

TABLE 3

| | Coating material | 4.0 V Impedance [Ω] | 4.1 V Impedance [Ω] | 4.2 V Impedance [Ω] |
|---|---|---|---|---|
| Example 1 | DLC/LZO | 68.02 | 101.24 | 179.39 |
| Comparative Example 1 | — | 430 | (Not measured) | (Not measured) |
| Comparative Example 2 | LZO | 107.91 | 158.00 | 353.61 |
| Comparative Example 4 | DLC | 128.54 | 198.41 | 401.98 |

Referring to Table 3, it was found that the test cell of Example 1 had a decrease of internal resistance components compared to those of Comparative Examples 1, 2, and 4. That is, a reaction at the interface of the positive active material particle 101 and the solid electrolyte 300 was suppressed, and generation of resistance components was suppressed in the test cell of Example 1 compared to those of Comparative Examples 1, 2, and 4. In particular, it was found that the test cell of Example 1 including the positive active material particle 101 having the first coating layer 102 including DLC on the surface of the positive active material particle 101 and the second coating layer 103 including LZO had a decreased internal resistance compared to those of Comparative Examples 1, 2, and 4, which did not include the two layers.

Particularly, even when the test cell of Example 1 was charged with a higher upper voltage, the test cell of Example 1 had a suppressed internal resistance compared to those of Comparative Examples 1, 2, and 4. Therefore, it was found that even when the load of the lithium ion secondary battery was large (that is, the voltage was high during charging), the test cell of Example 1 had satisfactory characteristics.

As shown in the evaluation results above, the first coating layer 102 and the second coating layer 103 may be sequentially stacked on the positive active material particle 101 in the lithium ion secondary battery 1 to prevent generation of resistive components at an interface between the positive active material particle 101 and the solid electrolyte 300. Furthermore, the lithium ion secondary battery 1 may secure satisfactory lithium ion conductivity between the positive active material particle 101 and the solid electrolyte 300 due to the first coating layer 102 and the second coating layer 103. Therefore, the lithium ion secondary battery 1 according to an exemplary embodiment may have improved discharge capacity and load characteristics.

As described above, the positive electrode may improve discharge capacity and load characteristics of a lithium ion secondary battery.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite positive electrode material for a lithium ion secondary battery, the positive electrode comprising:
   a positive electrode particle comprising a positive active material particle, wherein the positive electrode particle comprises
      a first coating layer on a surface of the positive active material particle wherein the first coating layer comprises a carbonaceous material, and
      a second coating layer on the first coating layer, wherein the second coating layer comprises a lithium-containing compound; and
   a sulfide solid electrolyte contacting the second coating layer of the positive electrode particle, wherein the lithium-containing compound of the second coating layer comprises a lithium-containing oxide, a lithium-containing phosphorus oxide, or a combination thereof, wherein the lithium-containing oxide is a lithium zirconium oxide, a lithium niobium oxide, a lithium titanium oxide, a lithium aluminum oxide, or a combination thereof, and wherein the lithium-containing phosphorus oxide is a lithium titanium phosphorus oxide, a lithium zirconium phosphorus oxide, or a combination thereof.

2. The composite positive electrode material of claim 1, wherein the carbonaceous material comprises amorphous carbon.

3. The composite positive electrode material of claim 1, wherein the carbonaceous material comprises carbon and further comprises a hydrocarbon represented by the formula $C_{4n+6}H_{4n+12}$, where n is a positive integer.

4. The composite positive electrode material of claim 1, wherein the carbonaceous material comprises diamond-like-carbon.

5. The composite positive electrode material of claim 4, wherein the diamond-like-carbon comprises hydrogen atoms in an amount in a range of about 1 atomic percent to about 50 atomic percent, based on a total content of the diamond-like-carbon.

6. The composite positive electrode material of claim 4, wherein the diamond-like-carbon comprises carbon atoms having $sp^2$ hybrid bonds and carbon atoms having $sp^3$ hybrid bonds, and
wherein a content of the carbon atoms having $sp^3$ hybrid bonds in the diamond-like-carbon is in a range of about 10% to about 100%, based on a total carbon atom content of the diamond-like-carbon.

7. The composite positive electrode material of claim 1, wherein a thickness of the first coating layer is in a range of about 1 nanometer to about 50 nanometers.

8. The composite positive electrode material of claim 1, wherein the lithium-containing oxide comprises $aLi_2O$—$ZrO_2$, where $0.1 \leq a \leq 2.0$.

9. The composite positive electrode material of claim 1, wherein a sum of a thickness of the first coating layer and a thickness of the second coating layer is in a range of about 1 nanometer to about 500 nanometers.

10. The composite positive electrode material of claim 1, wherein the positive active material particle comprises a lithium salt of a transition metal oxide having a layered rock-salt type structure.

11. The composite positive electrode material of claim 10, wherein the lithium salt of a transition metal oxide having a layered rock-salt type structure is of the formula $LiNi_xCo_yM_zO_2$, wherein M is Al or Mn, $0<x<1$, $0<y<1$, and $x+y+z=1$.

12. The composite positive electrode material of claim 1, wherein the sulfide solid electrolyte comprises
sulfur,
lithium, and
phosphorus, silicon, boron, aluminum, germanium, zinc, gallium, indium, a halogen element, or a combination thereof.

13. The composite positive electrode material of claim 1, wherein the sulfide solid electrolyte comprises
a lithium sulfide, and
a silicon sulfide, a phosphorus sulfide, a boron sulfide, or a combination thereof.

14. The composite positive electrode material of claim 1, wherein the sulfide solid electrolyte comprises $Li_2S$ and $P_2S_5$.

15. The composite positive electrode material of claim 1, wherein the sulfide solid electrolyte is in a form of a particle.

16. A lithium ion secondary battery comprising the composite positive electrode material according to claim 1.

* * * * *